United States Patent
Bae et al.

(10) Patent No.: US 11,082,952 B2
(45) Date of Patent: Aug. 3, 2021

(54) METHOD FOR TRANSMITTING PHYSICAL UPLINK SHARED CHANNEL IN WIRELESS COMMUNICATION SYSTEM AND DEVICE THEREFOR

(71) Applicant: LG Electronics Inc., Seoul (KR)

(72) Inventors: Duckhyun Bae, Seoul (KR); Yunjung Yi, Seoul (KR); Daesung Hwang, Seoul (KR); Ilmu Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 53 days.

(21) Appl. No.: 16/478,982

(22) PCT Filed: Feb. 5, 2018

(86) PCT No.: PCT/KR2018/001502
§ 371 (c)(1),
(2) Date: Jul. 18, 2019

(87) PCT Pub. No.: WO2018/143741
PCT Pub. Date: Aug. 9, 2018

(65) Prior Publication Data
US 2019/0357178 A1   Nov. 21, 2019

Related U.S. Application Data

(60) Provisional application No. 62/454,872, filed on Feb. 5, 2017, provisional application No. 62/475,996, filed
(Continued)

(51) Int. Cl.
*H04W 72/02* (2009.01)
*H04L 1/00* (2006.01)
(Continued)

(52) U.S. Cl.
CPC ........... *H04W 72/02* (2013.01); *H04L 1/0061* (2013.01); *H04L 1/1819* (2013.01);
(Continued)

(58) Field of Classification Search
CPC .. H04W 72/02; H04W 72/04; H04W 72/0406; H04W 72/0453; H04W 72/0413;
(Continued)

(56) References Cited

U.S. PATENT DOCUMENTS

| | | | |
|---|---|---|---|
| 2013/0250903 A1* | 9/2013 | Ahn | ...................... H04L 5/0098 370/329 |
| 2014/0192767 A1 | 7/2014 | Au et al. | |

(Continued)

FOREIGN PATENT DOCUMENTS

WO    WO-2015129985 A1 *   9/2015   ........ H04W 72/0413

OTHER PUBLICATIONS

Huawei: "Grant-free transmission scheme for UL URLLC", R1-1611689, 3GPP TSG RAN WG1 Meeting #87, Reno, Nevada, US, Nov. 14-18, 2016.
(Continued)

*Primary Examiner* — Peter Chen
(74) *Attorney, Agent, or Firm* — Dentons US LLP

(57) ABSTRACT

Disclosed are a method for a User Equipment (UE) transmitting a physical uplink shared channel (PUSCH) and a device therefor according to various embodiments. Disclosed are a method for transmitting a PUSCH and a device therefor, the method comprising the steps of: receiving an uplink (UL) grant from a base station; selecting at least one radio resource among a first radio resource which is a radio resource allocated by the UL grant, and a predetermined second radio resource; and transmitting a PUSCH using the selected at least one radio resource, wherein the second radio resource is a radio resource enabling PUSCH transmission without receiving the UL grant.

4 Claims, 10 Drawing Sheets

Related U.S. Application Data on Mar. 24, 2017, provisional application No. 62/617,072, filed on Jan. 12, 2018.

(51) Int. Cl.
| | |
|---|---|
| *H04L 1/18* | (2006.01) |
| *H04L 5/00* | (2006.01) |
| *H04L 5/10* | (2006.01) |
| *H04W 72/04* | (2009.01) |
| *H04W 72/10* | (2009.01) |
| *H04W 72/14* | (2009.01) |

(52) U.S. Cl.
CPC .............. *H04L 5/0051* (2013.01); *H04L 5/10* (2013.01); *H04W 72/0413* (2013.01); *H04W 72/10* (2013.01); *H04W 72/14* (2013.01)

(58) Field of Classification Search
CPC ............. H04W 72/042; H04W 72/044; H04W 72/0446; H04W 72/10; H04W 72/12; H04W 72/1278; H04W 72/1289; H04W 72/14; H04W 76/27; H04W 74/002; H04W 74/006; H04W 74/0833; H04L 5/0001; H04L 5/0048; H04L 5/005; H04L 5/0051; H04L 5/0053; H04L 5/10; H04L 1/0061; H04L 1/1664; H04L 1/1854; H04L 1/1819; H04L 1/1887; H04L 1/08
See application file for complete search history.

(56) References Cited

U.S. PATENT DOCUMENTS

| | | |
|---|---|---|
| 2015/0257150 A1 | 9/2015 | Yi et al. |
| 2016/0183290 A1 | 6/2016 | Ko et al. |
| 2016/0366704 A1* | 12/2016 | Lee .................. H04W 72/0413 |
| 2018/0249513 A1* | 8/2018 | Chang .................. H04W 48/14 |

OTHER PUBLICATIONS

Nokia: "Relationship between grant-free and grant-based access", R1-1609655, 3GPP TSG RAN WG1 Meeting #86bis, Lisbon, Portugal, Oct. 10-14, 2016.
Nokia: "Grant-free to grant-based switching for URLLC", R1-1612253, 3GPP TSG RAN WG1 Meeting #87, Reno, Nevada, US, Nov. 14-18, 2016.
Ericsson: "On Reference Signal Design for Grant-free Access", R1-1612956, 3GPP TSG RAN WG1 Meeting #87, Reno, Nevada, US, Nov. 14-18, 2016.
International Search Report from PCT/KR2018/001502, dated May 18, 2018.
Written Opinion of the ISA from PCT/KR2018/001502, dated May 18, 2018.
R1-160614, XP051053943: 3GPP TSG WG1 Meeting #84, St Julian's, Malta, Feb. 15-19, 2016, LG Electronics: "Remaining details for eMTC," (7 Pages).
R1-161377, XP051079299: 3GPP TSG RAN WG1 #84, St. Julians, Malta, Feb. 15-19, 2016, Samsung: "Update on Summary of Collision Handling Apects for LC/CE UEs," (13 Pages).
CATT, "URLLC HARQ operation", 3GPP TSG RAN WG1 AH_NR Meeting, Jan. 16-20, 2017, R1-1700205.
ZTE, ZTE Microelectronics, "Basic Grant-free Transmission for URLLC", 3GPP TSG RAN WG1 AH NR Meeting, Jan. 16-20, 2017, R1-1700253.
Ericsson, "Status Report to TSG", 3GPP TSG RAN meeting #71, Mar. 7-10, 2016, RP-160046.
Search Report of European Patent Office in Appl'n No. 18747132.1, dated Oct. 15, 2020.

* cited by examiner

FIG. 2
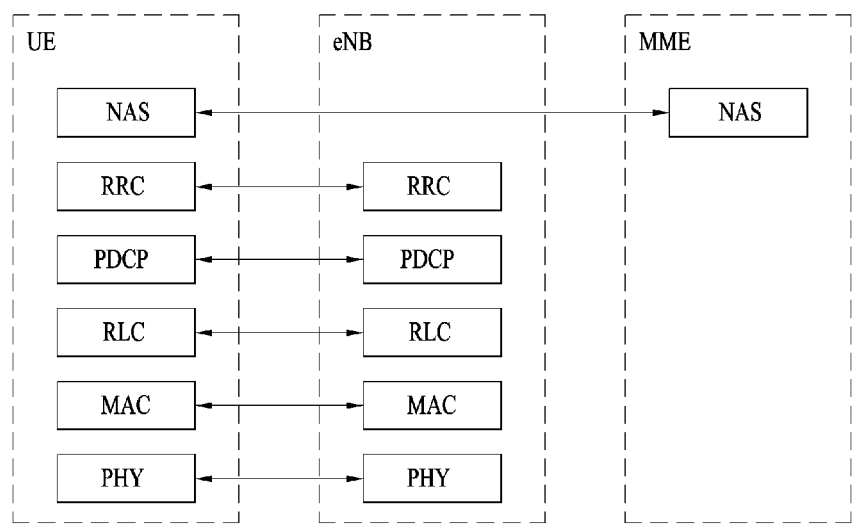
(A) CONTROL-PLANE PROTOCOL STACK
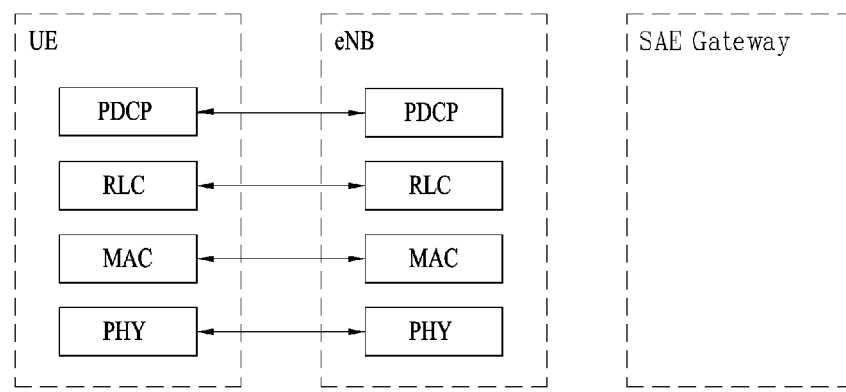
(B) USER-PLANE PROTOCOL STACK

METHOD FOR TRANSMITTING PHYSICAL UPLINK SHARED CHANNEL IN WIRELESS COMMUNICATION SYSTEM AND DEVICE THEREFOR

This application is a National Stage Entry of International Application No. PCT/KR2018/001502 filed Feb. 5, 2018, which claims priority to U.S. Provisional Application Nos. 62/454,872 filed Feb. 5, 2017; 62/475,996 filed Mar. 24, 2017 and 62/617,072 filed Jan. 12, 2018, all of which are incorporated herein by reference.

TECHNICAL FIELD

The present invention relates to a method for transmitting a physical uplink shared channel in a wireless communication system and a device therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

A technical task of the present invention is to provide a method for transmitting a physical uplink shared channel by selecting a UL grant-based radio resource and a UL grant-free radio resource the according to a priority order or using the radio resources simultaneously, and a device therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

In one aspect of the present invention, provided herein is a method for transmitting a physical uplink shared channel (PUSCH) by a User Equipment (UE) in a wireless communication system, the method including receiving an uplink (UL) grant from a base station, selecting at least one radio resource of a first radio resource and a second radio resource, the first radio resource being a radio resource allocated by the UL grant and the second radio resource being preconfigured, and performing PUSCH transmission using the at least one selected radio resource, wherein the second radio resource is a radio resource available for the PUSCH transmission without receiving the UL grant.

According to an embodiment, when the first radio resource and the second radio resource are radio resources for different frequency regions in the same slot, the at least one radio resource may be selected as only one of the first radio resource and the second radio resource based on a preconfigured priority.

According to an embodiment, the preconfigured priority may be at least one priority selected from among a priority according to sizes of the radio resources used in transmitting the PUSCH, a priority according to reliability of the radio resources used in transmitting the PUSCH, and a priority according to HARQ feedback timing corresponding to the radio resources used in transmitting the PUSCH.

According to an embodiment, the preconfigured priority may be a priority according to a characteristic of a payload transmitted from a higher layer of the UE to a physical layer.

According to an embodiment, the preconfigured priority may be a priority according to reliability or a latency requirement for uplink control information (UCI).

According to an embodiment, the at least one radio resource may be selected from the first radio resource and the second radio resource based on a preconfigured priority, wherein the preconfigured priority may be a priority according to whether piggyback of uplink control information (UCI) is allowed on the first radio resource and the second radio resource.

According to an embodiment, the preconfigured priority may further include a priority according to a type of the received UL grant.

According to an embodiment, when the first radio resource and the second radio resource are radio resources for different slots and an interval between the slots is within a preconfigured interval, the at least one radio resource may be selected as the first radio resource.

According to an embodiment, the preconfigured interval may be configured based on HARQ timing for the second radio resource.

According to an embodiment, when the first radio resource by the UL grant is acquired during repetition using the second radio resource, the at least one radio resource may be selected as the first radio resource, and wherein the repetition using the second radio resource may be halted.

According to an embodiment, when the first radio resource by the UL grant is acquired after completion of repetition using the second radio resource, the at least one radio resource may be selected as the first radio resource, and wherein the UE may perform the repetition again using the first radio resource.

According to an embodiment, the method may further include receiving, from the base station, a halting signal for halting transmission of the PUSCH using the second radio resource, wherein, when the halting signal may be received, the at least one radio resource is determined only as the first radio resource.

According to an embodiment, the method may further include receiving, from the base station, a permission signal for permitting transmission of the PUSCH using the first radio resource and the second radio resource.

According to an embodiment, when the permission signal is received and the first radio resource and the second radio resource are radio resources for different frequency regions in the same slot, the first radio resource and the second radio resource may be used for different transport blocks.

According to an embodiment, when the permission signal is received, and the first radio resource and the second radio resource are radio resources for different frequency regions in the same slot, a transmission power for the second radio resource may be allocated prior to a transmission power for the first radio resource in consideration of a path loss.

According to an embodiment, when the permission signal is received, and the first radio resource and the second radio resource include a third radio resource overlapped in a slot and frequency domain, the at least one radio resource may be selected as the first radio resource with a portion corresponding to the third radio resource punctured or rate-matched.

According to an embodiment, the first radio resource and the second radio resource are distinguished by at least one of a demodulation reference signal (DMRS) sequence, a DMRS mapping pattern, and a cyclic redundancy check (CRC) mask.

Advantageous Effects

According to embodiments of the present invention, a UL grant-based radio resource and a UL grant-free radio resource may be selected or used simultaneously according to a preset priority order. Thereby, the physical uplink shared channel may be efficiently transmitted.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 2 is a diagram for structures of control and user planes of radio interface protocol between a 3GPP radio access network standard-based user equipment and E-UTRAN;

BEST MODE

Figure 1:
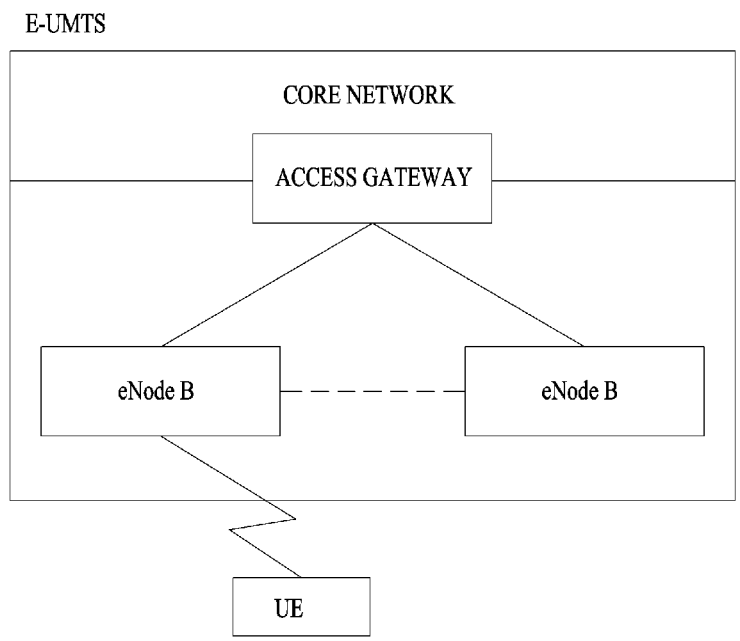
FIG. 1 is a schematic diagram of E-UMTS network structure as one example of a wireless communication system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

Although the embodiment of the present invention is described based on an LTE system and an LTE-A system in this specification, the LTE system and the LTE-A system are only exemplary and may be applied to all systems corresponding to the aforementioned definition.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
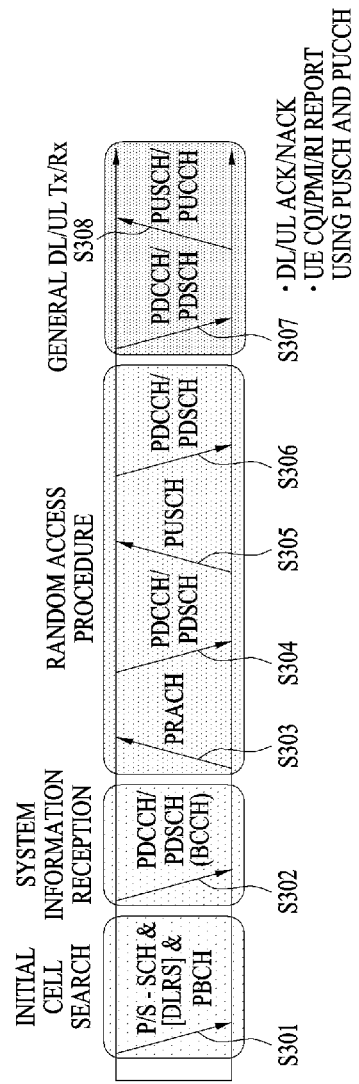
FIG. 3 is a diagram for explaining physical channels used for 3GPP system and a general signal transmission method using the physical channels.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
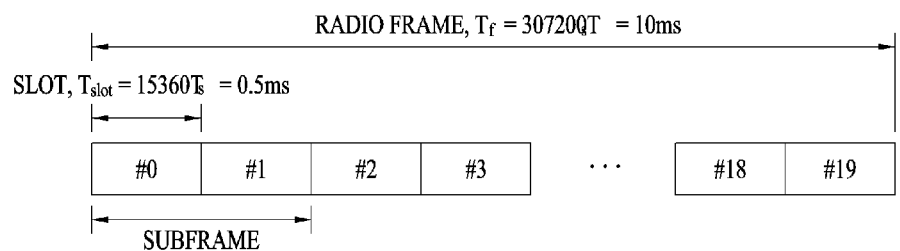
FIG. 4 is a diagram for a structure of a radio frame in LTE system.

FIG. 4 illustrates a structure of a radio frame used in the LTE system.

Referring to FIG. 4, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and $Ts=1/(15\ kHz \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
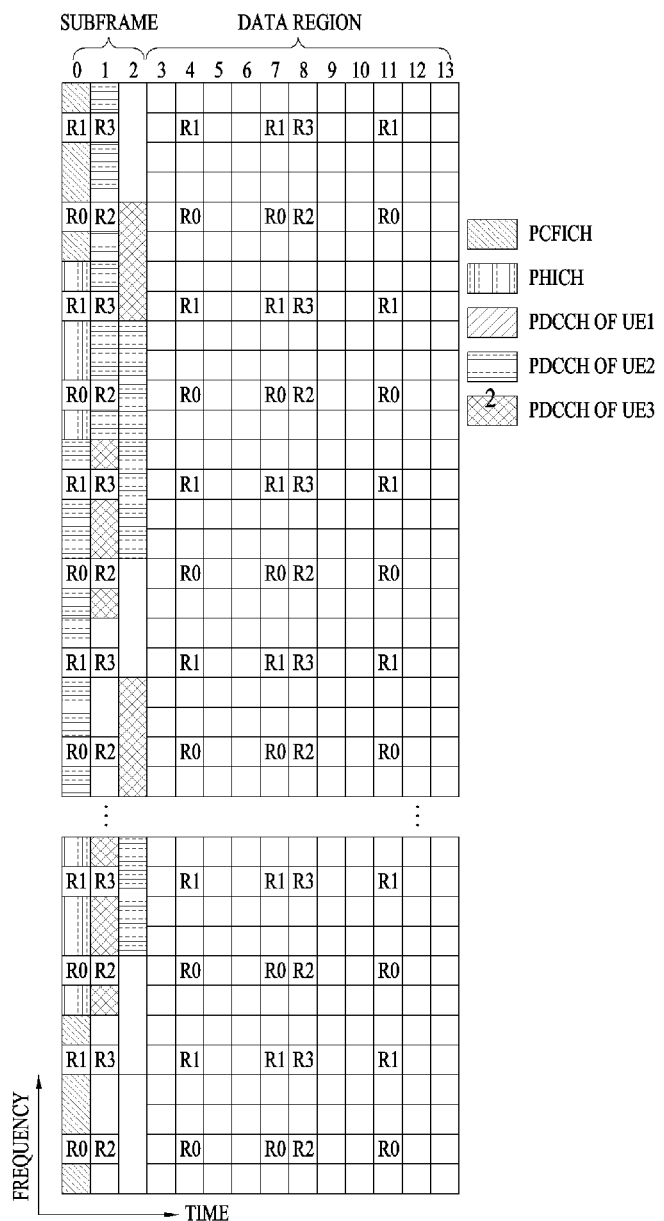
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
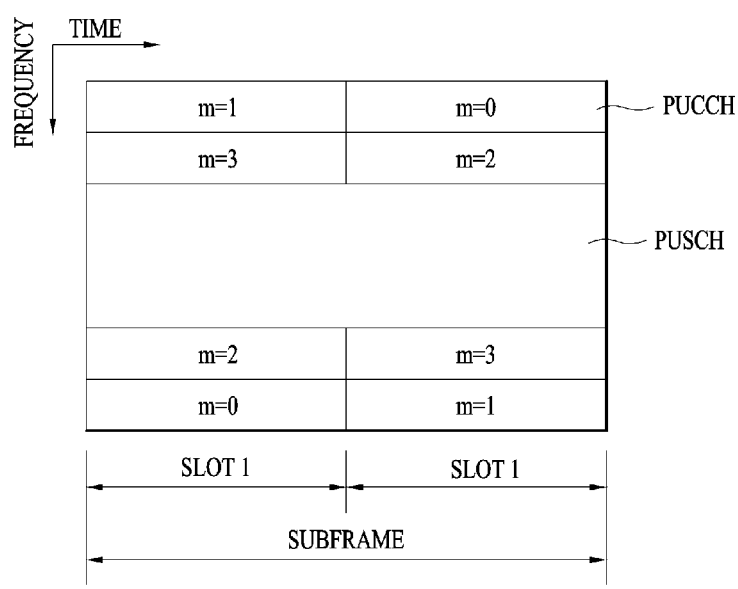
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feed back CSI on a downlink signal by allocating a PUCCH (Physical Uplink Control CHannel) or a PUSCH (Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above, and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64 (8×8) antenna elements of a 2D array may be installed in a panel of 4 by 4 cm at an interval of 0.5 lambda (wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 7:
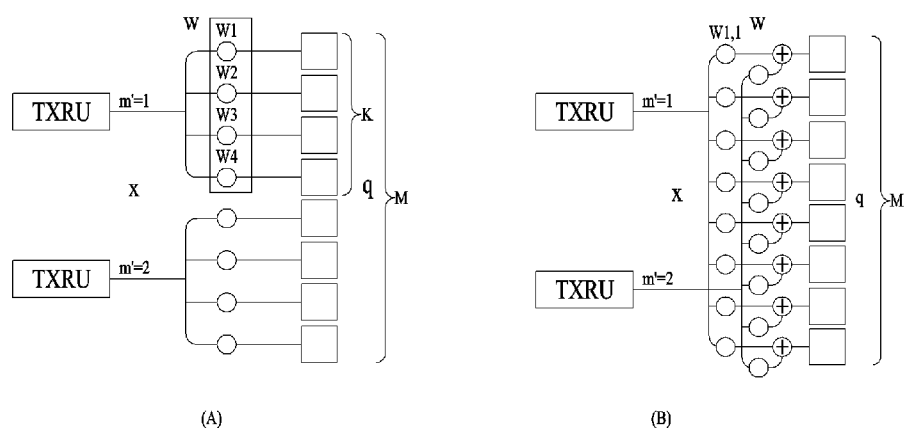
FIG. 7 illustrates examples of a connection scheme between TXRUs and antenna elements.

FIG. 7 illustrates examples of a connection scheme between TXRUs and antenna elements.

FIG. 7 (a) illustrates that TXRU is connected to a sub-array. In this case, the antenna elements are connected to only one TXRU. Unlike FIG. 7 (a), FIG. 7 (b) illustrates that TXRU is connected to all antenna elements. In this case, the antenna elements are connected to all TXRUs. In FIG. 7, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 8:
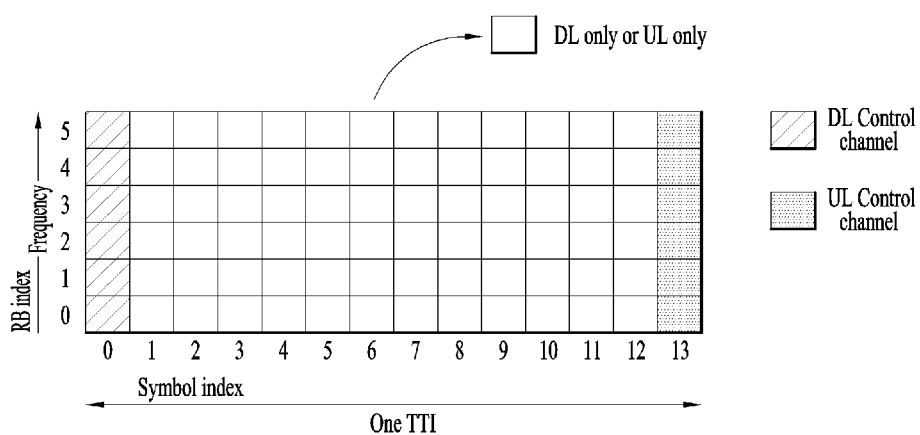
FIG. 8 illustrates an example of a self-contained subframe structure.

A self-contained subframe structure shown in FIG. 8 is considered in the fifth generation NewRAT to minimize data transmission latency in a TDD system. FIG. 8 illustrates an example of a self-contained subframe structure.

In FIG. 8, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period
downlink control period+downlink data period
downlink control period+GP+uplink data period+uplink control period
downlink control period+GP+uplink data period In the fifth generation NewRAT system, various reference time units are used in transmitting and receiving a physical channel depending on the application field or traffic type. The reference time may be a basic unit for scheduling a specific physical channel. The reference time unit may be varied according to the number of symbols constituting a scheduling unit and/or the subcarrier spacing.

In an embodiment of the present invention, for simplicity, it is assumed that the reference time unit is a slot and a mini-slot. The slot may be a basic unit of scheduling used for general data traffic such as, for example, data transmitted in an enhanced mobile broadband (eMBB). A mini-slot has a time period smaller than a slot in the time domain and may be a basic unit of scheduling used for traffic or a communication scheme for a special purpose, such as ultra reliable and low latency communication (URLLC), unlicensed band or millimeter wave.

It should be noted that what has been described above is merely an example for convenience of description of the present invention, and that the present invention is applicable even to a case where the eMBB is used to transmit and receive physical channels based on the mini-slot, or a case where URLLC or other communication techniques are used to transmit/receive physical channels based on a slot.

Grant-free transmission is a transmission that allows a UE to perform uplink transmission on a semi-persistent resource without receiving an UL grant prior to performing an uplink transmission. In the next-generation system, such transmission may be required depending on the application field or the type of traffic. For the grant-free transmission, radio resources shared by different UEs in a contention-based manner or radio resources allocated to the UE in a dedicated manner may be used. Since grant-free transmission does not require an UL grant reception operation for allocation of radio resources prior to transmission on the physical uplink shared channel, the grant-free transmission may be utilized for a service or traffic in a field requiring lower latency. The radio resource (or the second radio resource) used for grant-free transmission use a different modulation and coding scheme, a different transport block size, or a different transmission time interval (TT) from the radio resource allocated through the UL grant. Here, the TT may be a basic unit for scheduling a specific physical channel. The reference time unit may depend on the subcarrier spacing and/or the number of symbols constituting the corresponding scheduling unit.

In addition, the UE may be assigned multiple UL radio resources. In an example, even if the UE has already acquired information on a radio resource required for grant-free transmission from the BS, the UE may receive a UL grant from the BS anytime or a s needed. Alternatively, the UE may be allocated multiple grant-free radio resources for grant-free transmission from the BS. When the UE acquires the radio resource (or second radio resource) information on the grant-free operation and the radio resource (or first radio resource) information on the grant-based operation simultaneously, the UE may achieve low latency and/or high resource efficiency depending on how the radio resources are selected and used. In this context, a method of handling multiple pieces of UL resource information by a UE in consideration of various situations is proposed.

More specifically, the present invention proposes a method of determining priorities of radio resource information when the UE acquires information on two or more UL radio resource (grant-free radio resource and grant-based radio resources). In addition, the present invention proposes a method for performing, by at least one UE, more efficiently performing or stopping UL transmission using the priorities and/or other information.

Although embodiments of the present invention have been described focusing on the UL channel/signal and grant-free and grant-based radio resources, the present invention is not limited thereto. The embodiments may also be applied to other radio resources for the DL channel/signal.

Non-Overlapped UL Resources in Same Slot

When the UE acquires two or more kinds of UL radio resource information (e.g., information on a first radio resource, which is a radio resource used for grant-based transmission, and information on a second radio resource, which is a radio resource used for grant-free transmission), it may first compare the same to determine whether the corresponding radio resource regions overlap each other in terms of time and/or frequency. Particularly, in terms of latency, there may be a case where non-overlapped radio resource regions overlap in the time domain (or the radio resources are in the same slot but in difference frequency regions) and the opposite case (or a case where the radio resources are in different frequency regions and slots).

When allocated radio resources overlapping in the time domain (or the same slot), the UE may perform UL transmissions on the corresponding radio resources at the same time. According to an example, if grant-free and grant-based radio resources in the same slot are allocated to different frequency regions, the UE may simultaneously perform UL transmissions on the two radio resources. Prior to the UL transmission, the UE may determine whether to perform UL transmissions simultaneously based on factors such as such as simultaneous transmission capability, a Tx power headroom required for simultaneous transmission, and/or a configuration for simultaneous transmission of a network (or BS). The UE may determine whether to perform simultaneous UL transmission based on at least one of the factors, and the factors may have a mutual dependency. Specifically, a configuration for simultaneous transmission may be obtained from the network (or BS) by the simultaneous transmission capability of the UE or the Tx power headroom. More specifically, the UE may transmit a capability signal to the network (or the BS), wherein the capability signal is a signal for a capability of performing a grant-free UL transmission and a grant-based UL transmission to the network (or the BS) simultaneously. And the network (or the BS) may configure possibility of simultaneous transmission through at least one of high layer signaling, DCI corresponding to the UL grant-based transmission, and a third channel transmit with reference to the UE capability.

A radio resource used for grant-based transmission, which is a radio resource allocated according to an UL grant reception, may be defined as a first radio resource, and a radio resource used for grant-free transmission, i.e., a radio resource on which UL data transmission can be performed without receiving UL grant may be defined as a second radio resource.

When the simultaneous transmission is performed according to the determination (or when a permission signal permitting simultaneous transmission is received from the BS), the UE may transmit different transport blocks (TB) or the same TB on the two PUSCH resources (the first radio resource and the second radio resource).

For example, the UE may transmit different TBs on different resources (e.g., the first radio resource and the second radio resource). Here, the HARQ procedures of the two transmissions may be independent from each other. For example, when a grant-based PUSCH and a grant-free PUSCH are simultaneously transmitted at the same scheduling time, the HARQ procedures for the two transmissions may be separated from each other, and the corresponding repetitive transmissions (retransmissions) may be independently performed.

Alternatively, the UEs may transmit the same TB on different radio resources (or the first radio resource and the second radio resource). Here, the two transmissions may share the same HARQ procedure. For example, if the same TB is transmitted on the grant-based PUSCH and the grant-free PUSCH simultaneously, the retransmissions for the two transmissions may be one transmission. Alternatively, the HARQ redundancy versions (RVs) of the two transmissions may be the same or different for an effective HARQ increment redundancy scheme. For example, an RV explicitly indicated in an UL grant may be used on a radio resource used for grant-based transmission (hereinafter referred to as a grant-based radio resource), and the same RV or different RVs may be used on a radio resource used for grant-free transmission (hereinafter referred to as a grant-free radio resource). For example, if the RV of the grant-based radio resource is K, the RV of the grant-free radio resource may be K+2, K+1, or another value.

According to one embodiment, the UE may allocate Tx power for each of the two UL resources (or the first radio resource and the second radio resource), separately from the TB.

For example, in the grant-based transmission, the transmission power (Tx power) explicitly indicated in the UL grant may be used as it is, and the remaining residual Tx power with respect to the maximum Tx power may be allocated to grant-free transmission.

Alternatively, in consideration of reliability of the grant-free radio resource, Tx power considering a path loss with respect to a cell may be preferentially allocated, and then the remaining power other than the preferentially allocated Tx power may be allocated to the grant-based transmission with reference to the UL grant information.

Alternatively, if UCI is piggybacked on the grant-based radio resource, the UE may preferentially allocate the Tx power of the grant-based transmission.

Alternatively, if the available Tx power (or maximum Tx power) is not sufficient to perform transmissions simultaneously on the two UL resources, the UE may abandon one transmission, or may arbitrarily downscale the Tx power and perform simultaneous UL transmission. In this case, the Tx powers of the grant-based transmission and/or the grant-free transmission may be downscaled together.

If simultaneous transmission is not performed by the determination of the simultaneous transmission, the UE may select one of the grant-free radio resource (or the second radio resource) and the grant-based radio resource (or the first radio resource) and perform transmission thereon. In terms of latency, one of the grant-free radio resource (or the second radio resource) and the grant-based radio resource (or the first radio resource) may be selected based on HARQ timing that is or may be associated with the corresponding UL radio resource. For example, a radio resource preceding the other radio resources in time may take precedence among the radio resources that can be used to send HARQ ACK/NACK or corresponding information and correspond to a transmission scheme (e.g., grant-based or grant-free scheme). Alternatively, if a mini-slot grant-free resource of a grant-free radio resource, on which a UE can receive HARQ feedback in a slot precedes the others in the time domain, and the UE has obtained information about a grant-based resource on which the UE can receive HARQ feedback in the next or later slot, the transmission on the grant-based radio resource may be preferentially performed. This scheme may be advantageous in terms of latency as it causes ACK/NACK transmission to be performed as quickly as possible.

Alternatively, if the UE acquires UL radio resource information about two or more resources overlapping in the time domain (or the same slot) is acquired and the HARQ timings of the two resources are the same or less than a predetermined threshold (or regardless of HARQ timings (i.e., latency is not important) and reliability is given priority), the UE may select a radio resource based on the size of the radio resources and the transmission methods. Specifically, the size of a radio resource may be the size of a modulation and coding scheme and/or an TB available for transmission. More specifically, the transmission method may be contention-based grant-free transmission, contention-free grant-free transmission, grant-based transmission, or a combination thereof. The following is a more specific example of selecting a radio resource by the radio resource size and transmission method.

According to one example, the UE may prioritize and select a radio resource which has a larger amount (e.g., the number of REs and/or the acceptable TB size) between the grant-free radio resource (or the second radio resource) and the grant-based radio resource (or the first radio resource) regardless of the transmission scheme (e.g., grant-free or grant-based scheme). Specifically, when the amount of resources for a specific transmission scheme among the different transmission schemes is small as to be within a specific threshold, the specific transmission scheme may be given priority regardless of the amount of resources. In this case, the grant-based transmission and grant-based radio resources may be given priority. The grant-based radio resource is a resource allocated to the UE in a dedicated manner, and it may be advantageous for the UE to preferentially use the grant-based radio resource in terms of radio resource efficiency. Furthermore, if the grant-free radio resource is a contention-based resource, selecting the grant-based radio resource to perform grant-based transmission may reduce collisions between the radio resources. Alternatively, even when the grant-free radio resource is allocated as a contention-free radio resource, the grant-based radio resource may have higher reliability because it can be allocated through grant-based dynamic Adaptive Modulation and Coding (AMC). Alternatively, the grant-free radio resources may take precedence. For example, when the amount of radio resources for a transmission scheme (or grant-based transmission) which uses grant-based radio resources is small as to be within a certain threshold, it may be advantageous to perform transmission using the grant-free radio resource if the grant-free radio resource is a large size radio resource because the number of TBs can be increased for a radio resources of a small size in terms of latency. The specific threshold may be predetermined based on at least one of the payload size and the buffer status of a higher layer.

If the BS additionally schedules grant-based radio resources including the allocated radio resources or a grant-based radio resource for the same time (or the same slot) for the UE to which the contention-free grant-free radio resource is allocated, the UE may prioritize the grant-based radio resource and grant-based transmission and reuse the contention-free grant-free radio resource. More specifically, reuse of the contention-free grant-free radio resource may be utilized for the BS to allocate the resources to other UEs or for a UE allocated the resources to transmit the UCI. Alternatively, the other UE may sense the contention-free grant-free resource and use the same as a contention-based grant-free radio resource. The sensing may be performed based on information configured and signaled for a specific UE or a specific cell through higher layer signaling of the network (or the BS).

Alternatively, the UE prioritize and select a resource having a larger amount (e.g., a larger number of REs and/or acceptable TB size) between the first radio resource and the second radio resource regardless of the transmission scheme (e.g. grant-free or grant-based scheme). If the grant-based radio resource is given priority, the BS may allow the UE to use a pre-allocated grant-free radio resource through signaling in order to improve utilization of the contention-based grant-free radio resource. Specifically, the signaling may be higher layer signaling for a specific UE/specific UE group or DCI for the specific UE/DCI for a UE group.

Alternatively, the UE may prioritize and select a radio resource which has a larger amount (e.g., the number of REs and/or the acceptable TB size) between the first radio resource and the second radio resource regardless of the transmission scheme (e.g., grant-free or grant-based schemes). If the grant-based radio resource is given priority, the UE may reuse the unused grant-based resource. Specifically, the reuse may mean that the radio resource is allocated to another UE by the BS, is used by the UE for UCI transmission or the like, or is used by another UE as a contention-based grant-free radio resource through sensing. The sensing may be performed based on information configured and signaled for a specific UE or a specific cell through higher layer signaling of the network (or the BS).

According to an example, one of the first radio resource and the second radio resource may be given priority and selected as a radio resource for UL shared channel transmission according to a characteristic of a payload transmitted from an higher layer to a physical layer of the UE. Specifically, the characteristic of the payload may be a quality of service (QoS) or a service type or served time of traffic. If the serving time of the traffic is relatively long, the gain of latency obtainable by transmission of the UL shared channel using the grant-free radio resource may not be large. In this case, it is advantageous to prioritize transmission of the UL shared channel using the grant-based radio resource.

Alternatively, one of a transmission scheme using the first radio resource (or grant-based transmission) and a scheme using the second radio resource (or grant-free transmission) may be selected through high layer signaling.

The BS may transmit a UL grant to the UE for a predetermined time (or persistently), wherein the UL grant may cause the UE to be allocated the grant-based radio resource of a size larger than the grant-free radio resource such that grant-based transmission is given priority for a predetermined time (or persistently). Specifically, the UL grant may include a grant by a random access or scheduling request. Alternatively, the UE may send an UL grant only when the BS can operate based on the buffer status report (BSR) of the UE without a random access or a scheduling request.

The above-described methods may be determined through configured and signaled information specifying a UE and a cell through higher layer signaling of the network (or the BS) or may be determined by the UE based on the information. Alternatively, they may be determined by UL grant or DCI.

Non-Overlapped UL Resources in Different Slot

Next, a case where the UE acquires two or more pieces of non-overlapped UL radio resource information, that is, a case where the radio resource regions do not overlap in terms of time may be considered. In particular, when a certain radio resource is within a preset time interval, particularly HARQ feedback timing, from another radio resource, the UE may selectively use radio resources. For example, when a grant-based radio resource positioned a few slots away from a contention-based grant-free resource is allocated, the UE may not use the contention-based grant-free resource, which has a risk of collision with resources, but use the grant-based radio resource that follows after the few slots. In the selective use, the entity that determines the use may be a UE or a network (or a BS).

According to an example, if the first radio resource (or the grant-based radio resource) and the second radio resource (or the grant-free radio resource) are allocated to different slots and are within a preset time interval from each other, the UE may select one of the first radio resource (or the grant-based radio resource) and the second radio resource (or the grant-free radio resource). Here, the preset time interval may be set based on HARQ feedback timing for each of the first radio resource and the second radio resource. For example, if the first radio resource (or the grant-based radio resource) is allocated within the preset time interval from the second radio resource (or the grant-free radio resource), the UE may select the first radio resource to minimize the collisions between radio resources. In this case, the UE may transmit the PUSCH using the first radio resource based on the received UL grant.

If the UE is the subject of the determination (e.g., selection of a radio resource) and performs repetitive transmission in order to secure reliability and reduce latency of the grant-free radio resource (or the second radio resource), the UE may stop or limit the repetition depending on whether acquisition of the grant-based radio resource of the temporal positions of the radio resources. Alternatively, if there is a semi-persistent grant-free radio resource (or the second radio resource) at a position a few slots away from the grant-based radio resource (or the first radio resource), the grant-free radio resource may be used to reduce latency.

According to an example, if a UE acquires a grant-based radio resource while performing repetition using a grant-free radio resource (or the second radio resource), the UE may stop the repetition that uses the grant-free radio resource. Specifically, the repetitive transmission (or repetition) using the grant-free radio resource may be stopped from the next time (e.g., mini-slot) after the time (e g, mini-slot) at which a UL grant for the UE is received. The UL grant may be limited to URLLC. Alternatively, the repetitive transmission (or repetition) using grant-free radio resource may be stopped after a specific time (e.g., the second mini-slot) following the time (e g, mini-slot) at which a UL grant for the UE is received, considering the time at which the UL grant is detected.

Alternatively, when a grant-based radio resource is acquired during repetition using a grant-free radio resource, the UE may perform repetition using the grant-free radio resource only until the transmission time of the grant-based radio resource.

Alternatively, if the size of the grant-based radio resource is smaller than the size of the grant-free radio resource on which repetition is performed, the UE may maintain the repetition using the grant-free radio resource without considering whether the grant-based radio resource is acquired. Alternatively, if the UE can perform simultaneous transmission on the two UL radio resources, repetition using the grant-based radio resource may be additionally performed at the same time.

According to an example, if the UE acquires a grant-based radio resource while performing repetition using a grant-free radio resource, the UE may defer use of the grant-based radio resource. In this case, the UE may transmit UL control information to the BS. Thereafter, the BS may newly allocate a grant-based radio resource after a preset time interval based on the content predetermined for the UE or contained in the control information. Alternatively, the BS may newly allocate a grant-based radio resource after a preset time interval based on the simultaneous transmission capability of the UE and the grant-free radio resource transmission.

Alternatively, if the UE acquires a grant-based radio resource within a preset time interval after completion of repetition using the grant-free radio resource, it may not perform UL transmission for the grant-based radio resource.

Alternatively, if the UE has acquired a grant-based radio resource within a preset time interval after repetition using grant-free radio resource is completed, the UE may perform the repetition again using the acquired grant-based radio resource, considering the retransmission using the grant-free radio resource to be unsuccessful.

Alternatively, if there is a grant-free radio resource available for transmission within a predetermined time after the UE acquires a grant-based radio resource according to the UL grant, the UE may perform PUSCH transmission using the grant-free radio resource. For example, if a UL grant is received in slot N and allocates a grant-based radio resource of slot N+K, the UE may perform PUSCH transmission using the grant-free radio resource in between slot N and slot N+K. Alternatively, the UE may determine a time at which the PUSCH transmission using the grant-free radio resource is to be stopped, based on the value of K. Alternatively, the UE may perform the PUSCH transmission using the grant-free radio resource from slot N+K−L to slot N+K−1 in consideration of the grant detection time (where L<=K).

Alternatively, if there is a grant-free radio resource available for transmission within a predetermined time after a UL grant is acquired and the size of the grant-free radio resource is greater than or equal to a predetermined threshold, the UE may use the grant-free radio resource in place of the grant-based radio resource until the time for PUSCH transmission using the grant-based radio resource. Specifically, the threshold may be determined based on at least one of a payload transmitted from a higher layer of the UE to the physical layer, a buffer status of the UE and a size of a TB, and may be determined by applying a constant ratio of the aforementioned factors.

When the network (or the BS) is the subject of the determination in selecting the radio resource, the network (or the BS) may request or force the UE to use the grant-free radio resource based on the radio resource efficiency or the critical latency of traffic. Alternatively, the UE may select one of the grant-free radio resource and the grant-based radio resource so as to satisfy a certain condition. Specifically, the condition may be about whether the critical latency is satisfied. For example, when the network (or the BS) transmits an UL grant to the UE, the network (or the BS) may include, in the UL grant, information on whether the UE is to perform transmission using the grant-free radio resource. Alternatively, when the UE receives a grant, the network may configure and signal whether to perform transmission using the grant-free radio resource to a UE through higher layer signaling by specifying the UE or cell.

Overlapped UL Resources

The UE may acquire two or more kinds of UL radio resource information (e.g., first radio resource information which is a grant-based radio resource and second radio resource information which is a grant-free radio resource) which overlap in the time domain and the frequency domain. If the UE or the network (or the BS) basically prioritizes the grant-free resource, the network (or the BS) may prevent such overlapping through scheduling. Alternatively, the network (or the BS) may allocate all or some of the grant-free resources allocated to the UE as grant-based radio resources because the grant-free radio resource generally has a lower frequency efficiency (or spectral efficiency) than the grant-based radio resource. That is, when a grant-based radio resource (or the first radio resource) and a grant-free radio resources (or the second radio resources) overlapping in terms of time and frequency are acquired, transmission by the UE using grant-based radio resource is expected, and therefore it is proposed that the UE prioritize PUSCH transmission using a grant-based radio resource. In addition, the present invention proposes a method for preventing a PUSCH transmission using a grant-based radio resource from failing in the radio resource region if the grant-free radio resource is a contention-based grant-free radio resource.

When the network (or the BS) transmits to the UE a UL grant for a grant-based radio resource overlapping with a contention-based grant-free radio resource, the network (or the BS) may send signaling for temporarily or persistently restricting PUSCH transmission, which is based on the grant-free radio resource, to the UE and/or the UE and other UEs that share the contention-based grant-free radio resource at the transmission time of the UL grant or thereafter. Specifically, the signaling may be higher layer signaling or DCI/group DCI for a specific UE or a specific group.

Alternatively, when the network (or the BS) transmits to the UE a UL grant for a grant-based radio resource overlapping with a contention-based grant-free radio resource, the network (or the BS) may allocate a lower modulation and coding scheme (MCS) to enhance reliability of the UE. Specifically, in allocating contention-based grant-free radio resources, the maximum MCS for each resource may be configured through higher layer signaling and/or L1 signaling.

Alternatively, when the UE receives a UL grant for a grant-based radio resource overlapping with a contention-based grant-free radio resource and transmits a PUSCH using the radio resource by the UL grant, the UE may perform repetition in the frequency domain to enhance reliability or the like.

When the UE and the network (BS) are allowed to perform UL simultaneous transmission and a part of grant-free radio resources are allocated to the UE as grant-based radio resources, the UE may prioritize PUSCH transmission using the grant-based radio resource, and perform grant-free transmission for a part of grant-free radio resources that are not overlapping. Alternatively, in transmitting the PUSCH based on the UL grant using the grant-based radio resource, the UE may use the grant-based radio resource with which puncturing or rate-matching performed on a part of the resource overlapping with the grant-free radio resource.

Alternatively, when the UE performs transmission for a grant-based radio resource, the UE may puncture or rate-match a certain region of the resource to be used, such that the BS identifies on-off keying about whether the transmission is a grant-free transmission or a grant-based transmission. For example, if a resource region used when the UE performs the grant-based transmission overlaps with grant-free radio resources of the UE or another UE, a portion corresponding to a resource region 'r' in which the orthogonal DM-RS sequence is transmitted may be punctured or rate-matched with the grant-free radio resource in the grant-based radio resource region 'R' used for the UL transmission, and the BS may use the resource region 'r' in identifying on-off keying and the like to determine whether the received PUSCH of the UE is a transmission for a grant-based radio resource.

Specifically, when orthogonal DM-RS sequences different from each other are used for each UE and the on-off keying is on (there is a resource region punctured or rate-matched on the received PUSCH of the UE and transmission of another UE is sensed in the region), the BS may decode the resource region 'r' to determine which UE has performed UL transmission for the grant-free radio resource. Alternatively, in order to distinguish the grant-free transmission from the grant-based transmission, the UE may perform code division multiplexing on different sequences for a specific resource region as in the case of a preamble or a pilot signal.

A grant-free UE (e.g., a URLLC UE) capable of performing transmission for multiple grant-free radio resources using the above-described method without a separate halting message and a grant-based UE (e.g., an eMBB UE) that performs grant-based transmission may perform transmission for one radio resource. In this case, the transmission for the grant-based radio resource may fail to be decoded due to a collision with a transmission for another grant-free radio resource. However, in the case of the grant-based transmission, the BS has information on the transmission, and accordingly both the UE that has attempted the grant-free transmission and the UE that has attempted the grant-based transmission may receive feedback from the BS.

Even if a UE is allocated a grant-based resource through a UL grant, the UE may preferentially use a grant-free resource under a predetermined condition. The condition may be an operation according to the characteristics or requirements of the traffic, a condition determined by signaling received from the BS or another device, or a condition implicitly or explicitly included in the UL grant message. Alternatively, the condition may be a case where the UE fails to receive the UL grant and does not recognize that the grant-based radio resource is allocated. In case that such a condition is satisfied, the network (or the BS) performs signaling for halting UL transmission using a grant-free radio resource to other UEs sharing a radio resource indicated by the UL grant. The halting message (or the halting signal) may be transmitted to each UE through a DCI or the like in a UE-specific/group-specific/cell-specific manner. The halting message may halt the UL transmission using the grant-free radio resource for a UE that wakes up from the DRX state and performs the UL transmission in a predetermined mini-slot or is already performing the UL transmission. Accordingly, the UE may perform monitoring at intervals narrower less than the basic scheduling time interval to receive the halting message. Alternatively, in the case where the UL grant includes resource information on multiple scheduling time intervals, the UE may perform monitoring at the multiple scheduling time intervals.

For example, if the UE receives a halting message, it may drop a transmission for a grant-free radio resource that is currently being performed or scheduled to be performed and may not perform transmission for a grant-free radio resource even in the future. Alternatively, the UE may drop a transmission for a grant-free radio resource in a mini-slot or slot in which the UE has received the halting message, and start a new transmission for the grant-free radio resource in a subsequent mini-slot or slot. Alternatively, the UE may postpone the grant-free transmission in a mini-slot or slot in which the UE has received the halting message and resume the grant-free transmission in a subsequent mini-slot or slot.

Next, the network (or the BS) may allocate a grant-based radio resource overlapping only a part of the grant-free radio resources allocated to the UE. Here, if the size of the grant-based radio resource is relatively smaller than the size of the grant-free radio resource, the UE may not halt the grant-free transmission. The BS may identify which UE has performed the transmission among the UEs performing the transmission to the corresponding UE, through the DMRS. However, in order to address an issue that may arise in such a situation, the UE may distinguish between grant-based transmission and grant-based transmission. For example, when the modulation and coding schemes for the grant-based transmission and the grant-based transmission are different from each other, if the UE misses a UL grant indicating the grant-based radio resource and attempts grant-free transmission, the BS may fail in the corresponding reception. Considering this point, a method is proposed as follows.

First, in receiving a grant-free radio resource region overlapping with grant-based radio resources, the BS may attempt reception for all cases, assuming a situation where the grant-based radio resource can be included. For example, if the BS attempts reception but fails for a case where the grant-based radio resource is included, the BS may attempt reception assuming that a UE assigned the grant-based radio resource has attempted grant-free transmission. Alternatively, in grant-free transmission and grant-based transmission, the UE may use different DMRS sequences. For example, when the UE performs UL transmissions for the same radio resource, the UE may use DMRS1 when the grant-free configuration is used and DMRS2 when the information of the UL grant is used. Alternatively, the UE may use different DMRS mapping patterns for grant-free transmission and grant-based transmission. Alternatively, the UE may use different CRC masks in performing grant-based transmission and grant-based transmission. Such methods may be applied simultaneously. For example, the UE may use DMRS1 when the grant-free configuration is used and use DMRS2 when the UL grant information is used. Only when the BS detects this fact, it may attempt reception for all cases, assuming a situation where the grant-based radio resource can be included.

PUSCH Selection Considering UCI Piggyback

If the UE needs to transmit user data and UL control information (UCI) together without performing grant-based transmission and grant-free transmission simultaneously, it may select one of the grant-based radio resource and the grant-free radio resource, considering to whether UCI transmission is allowed. For example, when the UE needs to transmit DL HARQ-ACK, it may piggyback the DL HARQ-ACK and give priority to a radio resource (e.g., a grant-based PUSCH) available for transmission.

Alternatively, when there are two or more resources available for UCI transmission, a resource on which the UCI will be piggybacked and transmitted on the PUSCH may be selected based on the type of the UCI to be transmitted or the type of the service associated with the UCI. For example, there may be a case where dynamic grants or configured grants may be simultaneously present in multiple cells allocated to the UE.

The following is a more specific example of selecting a radio resource according to the service associated with the type of the UCI.

The UE may select a radio resource considering the reliability and/or the latency requirement of UCI. For example, in the case of UCI requiring high reliability, such as HARQ-ACK, a resource may be selected by giving priority to a contention-free radio resource over a contention-based radio resource and giving priority to a grant-based radio resource over a grant-based radio resource among the UL resources satisfying the latency requirement in consideration of reliability. Alternatively, since the reliability requirement of UCI such as HARQ-ACK is associated with the latency, they may be taken into consideration to lower the latency impact caused by UCI transmission failure.

As another example, in the case of UCI that requires relatively low reliability, such as channel status/state information (CSI), other methods of selecting the above-described radio resources by which user data can be effectively transmitted (e.g., preferentially selecting a radio resource with a larger size) may be applied.

Alternatively, the UE may select a radio resource in consideration of a service associated with the UCI. For example, when transmission of UCI (e.g., URLLC HARQ-ACK) about a latency-sensitive service is required, the UE may select the closest radio resource in terms of time regardless of the HARQ timing of UL radio resources, thereby reducing the latency. Here, if two or more radio resources are present at the same time, the UE may select a radio resource with the highest reliability. Specifically, the UE may select a resource by giving priority to the contention-free radio resource over the contention-based radio resource and the grant-based radio resource over the grant-free radio resource. When the service of the UCI is a latency-tolerant service, the UE may use the above-described methods of selecting one of the radio resources in consideration of the service of the user data transmitted together.

Alternatively, when there are two or more resources available for UCI transmission, the UE may select a radio resource using the above method considering HARQ timing, the resource size, the transmission method, and the like without considering UCI, and transmit the UCI together on the selected radio resource. Here, the UCI may be selectively transmitted depending on the latency and/or reliability caused by using the selected radio resource. For example, if it is determined (or estimated) that the reliability and/or latency of the selected radio resource will not satisfy the reliability and/or latency requirement of a predetermined UCI even if repetition is considered, the UE may not transmit the UCI.

Alternatively, when multiple cells are allocated to the UE and two or more resources are available for UCI transmission, the UE may unconditionally select radio resources for the primary cell (Pcell) without considering the UCI. In contrast, if resources are present only in the secondary cell (Scell), the UE may apply other methods for selecting the above-described radio resources, or may select a resource in ascending order of the indexes of the Scell or PUCCH group indexes. Alternatively, the UE may preferentially select a radio resource for an Scell, which is in the same PUCCH group as the Pcell.

Alternatively, the UE may consider whether one of available radio resources is for UL-SCH to be transmitted first. Grant-free transmission is used when UL-SCH data is present. Accordingly, even if there are UCI to be transmitted and a configured PUSCH radio resource, the UE may preferentially select a radio resource to be used for transmitting the PUSCH as a grant-based radio resource if there is no UL-SCH data to be transmitted.

Alternatively, the UE may select a radio resource in consideration of a configured grant type. For example, when the available radio resources of the UE are a type 1 radio resource and a type 2 radio resource of New RAT (NR), the type 2 radio resource may be preferentially used as a radio resource for piggybacking UCI. Specifically, if the activation signal includes information on the UCI separately (in, for example, a CSI request field) when the type 2 radio resource is activated, the type 2 resource may be given priority.

The present invention may efficiently utilize multiple radio resources having different characteristics from each other by selecting one of the grant-free radio resources and the grant-based radio resources through the above-described method. In addition, unnecessary signaling for resource selection between a UE and a BS may be significantly reduced.

Figure 9:
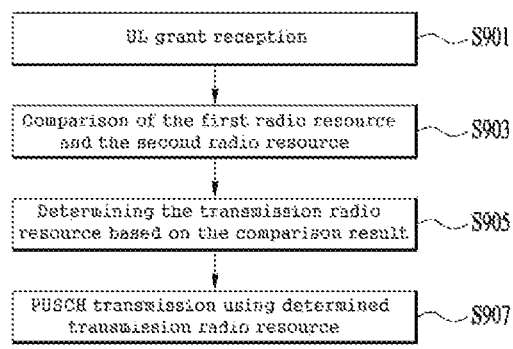
FIG. 9 is a flowchart illustrating a method for transmitting an uplink shared channel according to an embodiment of the present invention.

FIG. 9 is a flowchart illustrating a method for transmitting an uplink shared channel according to an embodiment of the present invention.

Referring to FIG. 9, the UE may receive a UL grant signal for radio resource allocation and the like from the BS. The UE may acquire a first radio resource, which is a grant-based radio resource, based on the UL grant signal. Herein, the UL grant signal may include not only information indicating the first radio resource, but also information on a transmission scheme for transmitting the PUSCH using the first radio resource (S901).

The second radio resource, which is a radio resource that may be used for PUSCH transmission, may be configured for the UE without receiving UL grant. The UE may be pre-allocated the second radio resource from the BS or another device, and may perform grant-free transmission using the resource.

The UE may compare the first radio resource with the second radio resource to determine whether the first radio resource and the second radio resource overlap with each other in the time domain or/and the frequency domain. Alternatively, the UE may compare the first radio resource and the second radio resource in terms of size, reliability, HARQ timing, and the like (S903).

The UE may select at least one radio resource of the first radio resource and the second radio resource based on the result of the comparison. For example, if the first radio resource and the second radio resource partially or entirely overlap with each other in the time domain and the frequency domain, the UE may select only one of the second radio resource and the second radio resource, and transmit the PUSCH using the selected radio resource (S905).

According to an embodiment, when the first radio resource and the second radio resource overlap with each other in the time domain but are independent in the frequency domain, the UE may select one of the first radio resource and the second radio resource according to a preconfigured priority. Here, the predetermined priority may include a priority according to a size of a radio resource used in transmitting the PUSCH, a priority according to reliability of the radio resource used in transmitting the PUSCH, and a priority according to HARQ feedback timing corresponding to the radio resource used in transmitting the PUSCH.

For example, when the preconfigured priority is a priority according to the reliability, the UE may select the first radio resource instead of the second radio resource because the first radio resource allocated as a dedicated radio resource is higher in reliability than the second radio resource. In this case, the UE may perform the PUSCH transmission (or grant-based transmission) based on the UL grant using the first radio resource.

Alternatively, if the preconfigured priority is configured as a priority according to the size of the radio resource, the UE may compare the size of the first radio resource with the size of the second radio resource. If the size of the second radio resource is larger than the size of the first radio resource, the UE may select the second radio resource as a radio resource for transmitting the PUSCH. In this case, the UE may perform PUSCH transmission (or transmission for the grant-free radio resource) based on a preconfigured transmission scheme (information on HARQ timing, MCS, DMRS, etc.) using the second radio resource.

Alternatively, if the preconfigured priority is a priority according to HARQ timing configured in transmitting the PUSCH using the first radio resource, the UE may select one radio resource by comparing HARQ timing configured in PUSCH transmission for the first radio resource (or HARQ timing configured by the UL grant) and HARQ timing configured in PUSCH transmission for the second radio resource. In particular, when a decrease in latency is required and the HARQ timing configured in the PUSCH transmission for the second radio resource precedes the first radio resource, the UE may select the second radio resource as a radio resource for PUSCH transmission. Meanwhile, the HARQ timing set in the PUSCH transmission for the second radio resource may be set beforehand to what HARQ timing is to be used when radio resources available for PUSCH transmission without a grant are previously allocated. Here, the HARQ timing includes HARQ feedback timing.

Alternatively, the UE may select one of the first radio resource and the second radio resource based on the priority according to reliability or the latency requirement for the UL control information (UCI). For example, if it is necessary to piggyback the UCI and transmit the PUSCH, and the UCI includes information on an ACK that gives priority to reliability, the UE may select a radio resource with higher reliability between the first radio resource and the second radio resource as a radio resource for piggybacking the UCI. Alternatively, the UE may preferentially select a radio resource available for piggybacking of the UCI between the first radio resource and the second radio resource. If both the first radio resource and the second radio resource are available for UCI piggyback, the UE may select one of the first radio resource and the second radio resource based on the reliability and latency requirement.

Alternatively, the type of the UL grant is determined according to a signaling method (DCI or RRC signaling) for configuring the UL grant. In this case, the UE may select one of the first radio resource and the second radio resource by applying a priority according to the type of the configured UL grant according to a signaling method. As described above, the UE may determine whether the radio resource is the type 1 radio resource or the type 2 radio resource according to the type of the configured UL grant. In this case, the UE may preferentially select the type 2 radio resource between the type 1 radio resource and the type 2 radio resource based on the type of the configured UL grant for scheduling of the PUSCH. For example, since the type 2 radio resource contains more control parameters than the type 1 radio resource, it is more efficient for the UE to preferentially select the type 2 radio resource and piggyback the UCI.

Alternatively, the UE may apply the above-described priorities in combination. For example, the preconfigured priority may be applied in a manner that the priority according to the HARQ timing is applied after the priority according to the size of the resource is applied. In this case, if the first radio resource and the second radio resource have the same resource size, the UE may select a radio resource with earlier HARQ timing.

The UE may perform PUSCH transmission using the selected radio resource. In this case, when the first radio resource is selected, the UE may use the first radio resource and transmit the PUSCH according to the transmission scheme based on the UL grant. On the other hand, if the second radio resource is selected, the UE may use the second radio resource and transmit the PUSCH according to a preconfigured transmission scheme rather than the transmission scheme based on the UL grant. Alternatively, if the PUSCH can be transmitted using the first radio resource and the second radio resource at the same time, the UE may use the first radio resource and may transmit a PUSCH according to the transmission scheme based on the UL grant and a PUSCH according to the preconfigured transmission scheme simultaneously (S907).

The BS may distinguish between the PUSCH transmission (or grant-based transmission) using the first radio resource and the PUSCH transmission (or the grant-free transmission) using the second radio resource. To this end, the UE may configure at least one of a demodulation reference signal (DMRS) sequence, a DMRS mapping pattern, and a cyclic redundancy check (CRC) mask differently for the grant-based transmission for the first radio resource and the grant-free transmission for the second radio resource.

According to an embodiment, even if the first radio resource and the second radio resource are in different slots and thus do not overlap with each other in the time domain, the UE may select one of the first radio resource and the second radio resource as a radio resource for PUSCH transmission if the interval between the slots is within a preconfigured interval. For example, if the UE receives a UL grant signal for allocating the first radio resource within the preconfigured slot interval (or a preconfigured time) from the slot to which the second radio resource is allocated, the UE may transmit the PUSCH using the first radio resource even if the transmission timing of the second radio resource is earlier than the transmission timing of the first radio resource, which is intended to transmit the PUSCH on a resource having higher reliability. Here, the preconfigured slot interval may be configured based on the HARQ timing configured for each of the first radio resource and the second radio resource.

If the UE receives a UL grant for allocating the first radio resource that overlaps with the second radio resource in the frequency domain during the repetition using the second radio resource, the UE may halt the repetition using the second radio resource. For example, the UE may halt the repetition using the second radio resource and perform the repetition using the first radio resource in order to enhance reliability of the repetition.

Alternatively, the UE may receive, from the BS, a halting message requesting that transmission of the PUSCH using the second radio resource should be halted. In this case, the UE may halt or postpone the transmission for the second radio resource in a predetermined mini-slot and slot unit.

The second radio resource may be preconfigured for multiple UEs based on contention. In this case, when any one of the UEs is allocated the first radio resource that overlaps with the second radio resource in the time domain and frequency domain, the BS may transmit or broadcast a signal including the halting message for halting the transmission of the PUSCH using the second radio resource to the other UEs in order to ensure the PUSCH transmission for the first radio resource without any risk of collision between the one UE and the other UEs.

According to one embodiment, the UE informs the BS that transmission can be performed on the first radio resource and the second radio resource at the same time, and receive, from the BS, a permission signal for permitting simultaneous transmission on the first radio resource and the second radio resource. Specifically, if the first radio resource and the second radio resource overlap with each other in terms of time and are independent from each other in the frequency domain, the UE may use the first radio resource and the second radio resource at the same time to transmit the PUSCHs for the first radio resource and the second radio resource at the same time. In this case, the UE may include a first TB in the first radio resource and a second TB different from the first TB in the second radio resource, thereby performing simultaneous transmission.

Alternatively, in performing simultaneous transmission, in order to enhance reliability of transmission for the second radio resource, which is relatively low, the UE may allocate Tx power for the second radio resource prior to Tx power for the first radio resource in consideration of a path loss, and allocate Tx power for the first radio resource based on the remaining Tx power and the Tx power configured in the UL grant.

Alternatively, if simultaneous transmission is possible but each of the first radio resource and the second radio resource includes third radio resources overlapping with each other in the slot (or time domain) and the frequency domain, the UE may not perform simultaneous transmission. In this case, the UE may select the first radio resource with higher reliability as a radio resource for PUSCH transmission. Then, the UE may puncture or rate-match the overlapped third radio resource region in the first radio resource region, and perform PUSCH transmission using the first radio resource that is punctured or rate-matched. As described above, the third radio resource that is punctured or rate-matched may be a region for the DMRS configured in the second radio resource.

Figure 10:
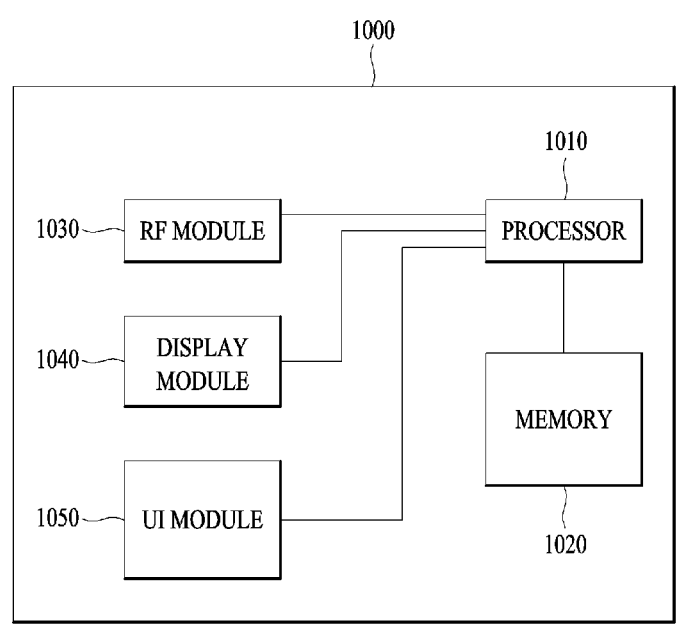
FIG. 10 is a block diagram of a communication device according to an embodiment of the present invention.

Referring to FIG. 10, a communication apparatus 1000 includes a processor 1010, a memory 1020, an RF module 1030, a display module 1040, and a User Interface (UI) module 1050.

The communication device 1000 is shown as having the configuration illustrated in FIG. 10, for the convenience of description. Some modules may be added to or omitted from the communication apparatus 1000. In addition, a module of the communication apparatus 1000 may be divided into more modules. The processor 1010 is configured to perform operations according to the embodiments of the present disclosure described before with reference to the drawings. Specifically, for detailed operations of the processor 1010, the descriptions of FIGS. 1 to 9 may be referred to.

The memory 1020 is connected to the processor 1010 and stores an Operating System (OS), applications, program codes, data, etc. The RF module 1030, which is connected to the processor 1010, upconverts a baseband signal to an RF signal or downconverts an RF signal to a baseband signal. For this purpose, the RF module 1030 performs digital-to-analog conversion, amplification, filtering, and frequency upconversion or performs these processes reversely. The display module 1040 is connected to the processor 1010 and displays various types of information. The display module 1040 may be configured as, not limited to, a known component such as a Liquid Crystal Display (LCD), a Light Emitting Diode (LED) display, and an Organic Light Emitting Diode (OLED) display. The UI module 1050 is connected to the processor 1010 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an higher node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The embodiments of the present invention as described above can be applied to various mobile communication systems.

The invention claimed is:

1. A method for transmitting a physical uplink shared channel (PUSCH) by a User Equipment (UE) in a wireless communication system, the method comprising:
   receiving an uplink (UL) grant from a base station;
   selecting at least one radio resource of a first radio resource and a second radio resource, wherein the first radio resource is allocated by the UL grant and the second radio resource is available for a PUSCH transmission without receiving an UL grant; and
   performing the PUSCH transmission using the at least one selected radio resource,
   wherein the at least one radio resource is selected as the first radio resource based on the first radio resource being acquired while performing repetitive transmission using the second radio resource,
   wherein the first radio resource is allocated to another slot within a preconfigured interval from the slot to which the second radio resource is allocated, and
   wherein the repetitive transmission using the second radio resource is halted.

2. The method of claim 1, wherein the preconfigured interval is configured based on HARQ (hybrid automatic repeat request) timing for the second radio resource.

3. The method of claim 1, wherein the first radio resource and the second radio resource are distinguished by at least one of a demodulation reference signal (DMRS) sequence, a DMRS mapping pattern, and a cyclic redundancy check (CRC) mask.

4. A User Equipment (UE) for transmitting a physical uplink shared channel (PUSCH) in a wireless communication system, comprising:
   a transmitter and a receiver configured to transmit and receive signals to and from a base station; and
   a processor configured to:
   control the receiver to receive an uplink (UL) grant from a base station;
   select at least one radio resource of a first radio resource and a second radio resource, wherein the first radio resource is allocated by the UL grant and the second radio resource is available for a PUSCH transmission without receiving a UL grant; and
   control the transmitter to perform the PUSCH transmission using the at least one selected radio resource,
   wherein the at least one radio resource is selected as the first radio resource based on the first radio resource being acquired while performing repetitive transmission using the second radio resource,
   wherein the first radio resource is allocated to another slot within a preconfigured interval from the slot to which the second radio resource is allocated, and
   wherein the repetitive transmission using the second radio resource is halted.

* * * * *